2 Sheets--Sheet 1.

J. STARRETT & W. KEAL.
Corn-Planters.

No.150,904. Patented May 12, 1874.

WITNESSES
J.B. Connolly
A. Connolly

James Starrett
William Keal
INVENTORS.

By Connolly Bros.
Attorneys.

AM. PHOTO-LITHOGRAPHIC CO. N.Y. (OSBORNE'S PROCESS)

J. STARRETT & W. KEAL.
Corn-Planters.
No. 150,904.
2 Sheets--Sheet 2.
Patented May 12, 1874.
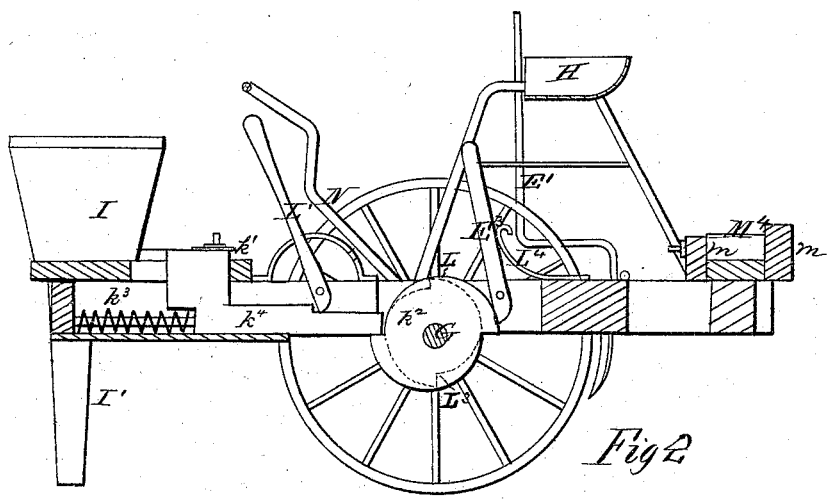
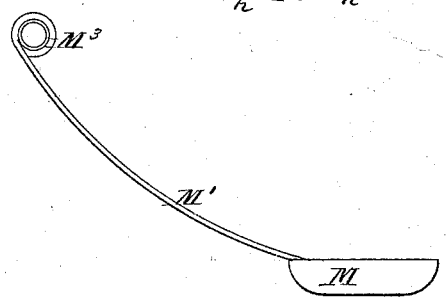
WITNESSES,
INVENTOR
By
Attorneys.

though both wheels revolve together when the implement is moving regularly.

UNITED STATES PATENT OFFICE.

JAMES STARRETT AND WILLIAM KEAL, OF PAYSON, ILLINOIS.

IMPROVEMENT IN CORN-PLANTERS.

Specification forming part of Letters Patent No. 150,904, dated May 12, 1874; application filed February 5, 1874.

*To all whom it may concern:*

Be it known that we, JAMES STARRETT and WILLIAM KEAL, connected in this business under the firm-name of STARRETT & KEAL, of Payson, in the county of Adams and State of Illinois, have invented certain new and useful Improvements in Self-Dropping Corn-Planters; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
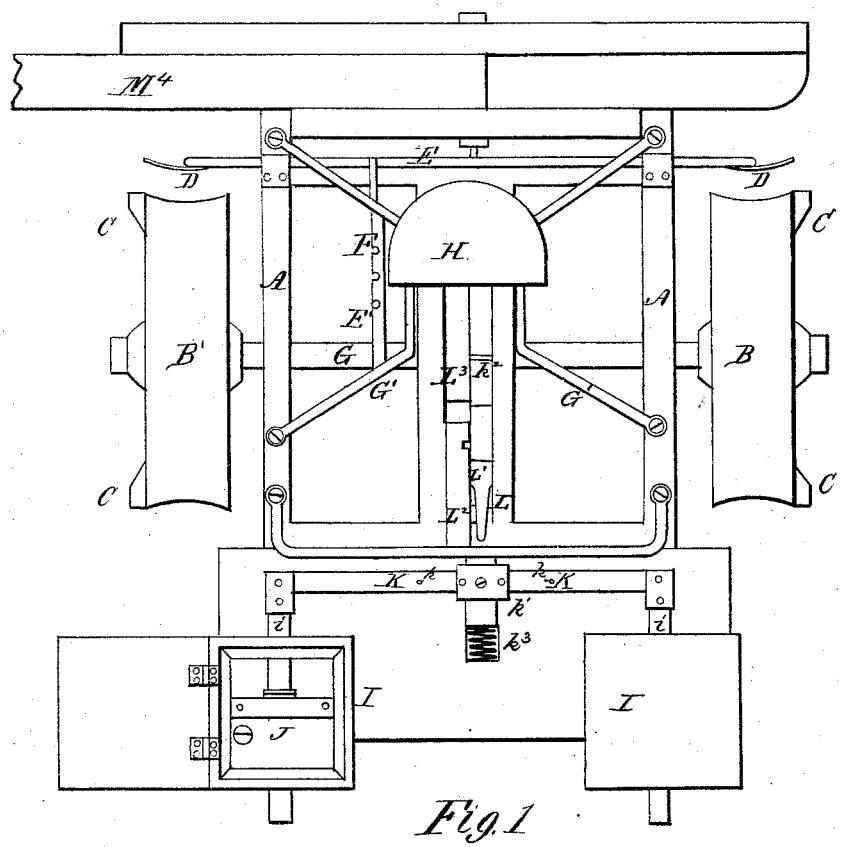
Figure 4:
Figure 3:
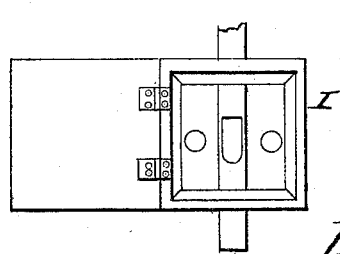

Figure 1 is a plan view of our invention. Fig. 2 is a vertical longitudinal section. Figs. 3, 4, 5, and 6 are details.

This invention has relation to corn-planters, and consists in the combination, with devices for imparting motion to the seed-slides, of devices for arresting the motion of axle, constructed and arranged as hereinafter described.

Referring to the accompanying drawings, A designates the frame of the implement, mounted on the wheels B B', to the faces of which are attached, at suitable intervals, the ears or projections C C to mark the hills. The rims or tires of said wheels are concave on their outer surfaces, so as to mold the earth to the desired form. Scrapers D D, of concavo-convex form, are arranged so that they may be brought to bear against said rims or tires to relieve them of earth and clods. These scrapers are affixed to the ends of a transverse shaft, E, having an arm, E¹, rising within convenient reach of the driver. F designates a rack, supported by the seat-braces, and designed to hold the lever or arm E¹ at any point to which it may be adjusted. The axle, designated by letter G, is located about midway between the ends of the frame. The seat is arranged behind said axle, and is supported upon the horizontal sections of the braces G', each formed from a single bar of metal, if preferred, bent to the shape illustrated in the drawings, and secured at their ends to the side bars of the frame. The seat H has attached to its under side loops or bent plates h, through which said horizontal sections of the braces G' pass, enabling said seat to be slid along to any desired position with reference to the axle. I indicates the seed boxes or hoppers, communicating with the planting-tubes I', and containing the slotted seed-slides i, through the reciprocation of which the openings in the bottom of the hoppers are alternately closed, and made to coincide with the openings in the slides. Directly above said openings, in the bottom of the hoppers, are placed the "cut-off" blocks J, recessed on their under surfaces, as shown at J¹, and provided with the concave or bent springs J², having turned-up flanges, j, on their forward ends.

In the operation of the slides their seed-openings are alternately moved under and beyond the cut-off blocks, thereby receiving and depositing a proper quantity of grain. The surplus grain is prevented from passing under the cut-off blocks by the flanges j. The springs are made to yield so as to not injure the seed by crushing the same. K represents levers fulcrumed on the frame A, at k, and pivoted at their outer ends to the forward ends of the seed-slides, and at their inner ends to plates, k¹, secured to a horizontal slide, k². Motion is given to the slide k¹ by means of a wiper wheel or cam, k², secured upon the axle, and a spring, k³, working between the end of the slide and the front transverse beam of the frame. A lever, L, works in connection with said slide, against a shoulder thereof, and is provided with a lip, L¹, which engages with a bent notched bar, L². The lever L is pivoted to the frame A, and when raised disengages the slide and wiper-wheel, and prevents the dropping devices from working. L³ designates another wiper wheel or cam, also attached to the axle close to the wiper-wheel k²; or, if found convenient, both wheels may be formed from the same piece of material. The wings of the respective wheels, it will be perceived, lie in opposite directions, those of the wheel L² being used merely as stops in connection with an arm, E³, which, by means of a spring, L⁴, is ordinarily held at a distance from said wheel L², but, when the implement is gaining ground or working irregularly, is brought in contact with its wheel and the rotation of the axle arrested, in which case but one of the wheels B B' turns, the same being loose upon the axle, while the other is fast, M represents the marker of return rows, consisting of a shoe or runner attached to the end of a curved arm, $M^1$, which is connected loosely by means of a ferrule or thimble, $M^3$, to the extremity of a bar, $M^4$, hinged to the rear end of the frame, midway between the sides. By means of said bar $M^4$ the marker is adjusted from side to side, at the end of each row, the shoe or runner adapting itself to the change. The portion of the bar $M^4$ which lies on the frame is rigidly held and braced by cleats $m$. N is a skeleton rest for the driver's feet.

Having described our invention, we claim—

1. The lever $E^3$ and spring $L^4$, for arresting the rotation of the axle, in combination with the cam $L^3$, substantially as described.

2. In a corn-planter having the cam $k^2$ and slide $k^4$, combined as and for the purpose specified, the cam $L^3$ and spring-lever $E^3$, for arresting the movement of the axle, substantially as specified.

In testimony that we claim the foregoing we have hereunto set our hands this 25th day of December, 1873.

JAMES STARRETT.
WILLIAM KEAL.

Witnesses:
L. M. DORT,
J. P. ELLIOTT.